United States Patent [19]

Morissette et al.

[11] Patent Number: 4,682,505
[45] Date of Patent: Jul. 28, 1987

[54] COMPACT TORQUE MEASUREMENT SYSTEM

[75] Inventors: Pierre Morissette; Alexander W. Stewart, both of St. Lambert; Keith H. Taylor, Candiac, all of Canada

[73] Assignee: Pratt & Whitney Canada Inc., Longueuil, Canada

[21] Appl. No.: 808,480

[22] Filed: Dec. 13, 1985

[51] Int. Cl.[4] .............................................. G01L 3/10
[52] U.S. Cl. .............................................. 73/862.34
[58] Field of Search ............ 73/862.32, 862.33, 862.34

[56] References Cited

U.S. PATENT DOCUMENTS 3,548,649 12/1970 Parkinson ..................... 73/862.34
3,823,607 7/1974 Rundell ........................ 73/862.34

FOREIGN PATENT DOCUMENTS 745891 12/1944 Fed. Rep. of Germany ... 73/862.21
2654863 4/1978 Fed. Rep. of Germany ... 73/862.34

Primary Examiner—Charles A. Ruehl
Attorney, Agent, or Firm—Schwartz, Jeffery, Schwaab, Mack, Blumenthal & Evans

[57] ABSTRACT

A compact torque measuring device for a gas turbine engine which has an output shaft. The torque measurement device includes a pair of tubular concentric shafts of elastic deformable material. The inner shaft is fixed to the output shaft and includes peripheral reference teeth fixed to the output shaft. The concentric shafts are fixed together at the other end in a cantilever manner. Peripheral teeth are mounted to the outer concentric shaft adjacent and interposed with the reference teeth. A magnetic electrical detector is provided to measure relative displacement between the teeth, and thus the torque magnitude can be determined.

4 Claims, 1 Drawing Figure

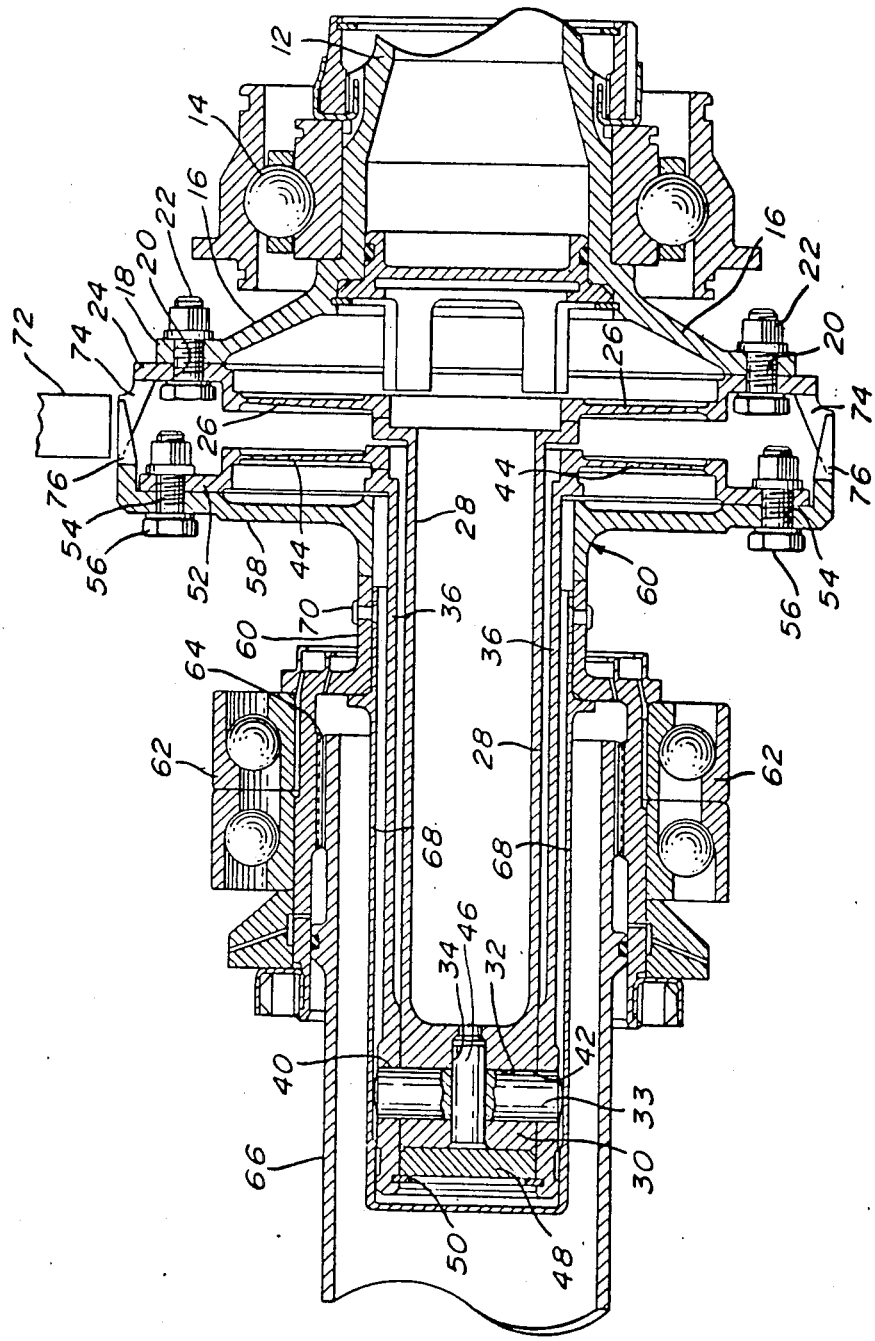

COMPACT TORQUE MEASUREMENT SYSTEM

BACKGROUND OF THE INVENTION

1. Field of the Invention

The present invention relates to torque measuring devices, and particularly to a device for measuring torque in the output shaft of a gas 1 turbine engine.

2. Description of the Prior Art

Gas turbine engines having an output shaft may be connected to a gear reduction assembly for driving a propeller or for driving generators and other auxiliary assemblies. It is important to monitor the torque of the output shaft to facilitate power management and to avoid overloading of the engine or transmission system.

Such shaft torque measuring devices are well known and commonly used in the gas turbine engine art with satisfactory results. Most such devices are provided with a single torque tube and a concentric cover which is used as a reference element. The cover is fixed at one end to the torque tube being measured. The other end is free and is provided with an exciter wheel in the form of a gear wheel having teeth which are compared in phase with a similar adjacent gear wheel mounted on the torque tube being measured. Evidently, the greater the linear distance between the fixed connection of the torque tube and cover to the exciter gear wheels, the greater the rotational displacement, under torque loading, there is between the gear teeth, allowing for more accurate torque measurement.

However, the length necessary for such a torque measuring device may, in some cases, be too great for the overall length of the engine, particularly in the design of small turbine engines, such as are used in a helicopter environment.

SUMMARY OF THE INVENTION

It is an aim of the present invention to provide a compact torque measuring device having a reduced linear dimension with comparable rotational phase displacement to a torque measuring device of significantly greater length.

A construction in accordance with the present invention comprises a torque measuring device adapted to be connected to the output shaft of an engine. The torque measuring device comprises a first shaft member adapted to be coupled at one end thereof to the output shaft of the engine, a second shaft member which is tubular and concentric with the first shaft member with the one end of the second shaft member fixedly connected to the other end of the first shaft member. The other end of the second shaft member is adjacent the one end of the first shaft member, and a third shaft member is coupled at one end thereof to the other end of the second shaft member. The third shaft member is tubular and concentric with the first and second shaft members and is adapted to be coupled with the input shaft of means to be driven. The first and second shaft members are elastically deformable in response to the magnitude of torque being transmitted between the output shaft of the engine and the input shaft of the means to be driven, and detecting means are associated with the one end of the first shaft member and the other end of the second shaft member to measure the relative phase displacement thereof and thus the magnitude of torque.

In a more specific embodiment of the present invention, the one end of the first shaft member is fixed to a radial diaphragm type wheel, and the connection with the output shaft of the engine is made at the periphery of the diaphragm wheel. A rim is also provided along the diaphragm wheel containing teeth. The other end of the second shaft member is also provided with a radial diaphragm wheel and the connection with the third shaft member is made at the outer periphery of the radial diaphragm wheel. Further, a rim is provided on the periphery of the diaphragm wheel having teeth intermeshing with the teeth of the diaphragm wheel on the one end of the first shaft member, and the detecting means is arranged such as to detect the relative distance between the intermeshing teeth of the respective rims.

BRIEF DESCRIPTION OF THE DRAWINGS

Having thus generally described the nature of the invention, reference will now be made to the accompanying drawings, showing by way of illustration, a preferred embodiment thereof, and in which:

The annexed drawing is a longitudinal cross-section taken through a torque measuring device in accordance with the present invention.

DESCRIPTION OF THE PREFERRED EMBODIMENTS

Referring to the drawing, there is shown on the right-hand side thereof the end of a shaft 12 which is the output shaft of the turbine engine (not shown). The shaft 12 is shown as mounted in bearing 14 also fixed to the casing of the engine (not shown). The end of the shaft 12 is flared to form a hub 16. The outer periphery 18 of the hub 16 is provided with a plurality of openings 20 through which fastening means in the form of a nut and bolt 22 is provided for fixing the rim 24 of a diaphragm disc 26.

Diaphragm disc 26 is in turn welded at its internal rim to a hollow shaft member 28 which is coaxial with the shaft 12. Shaft 28 includes an end portion 30 which is solid with the exception of a lateral diametrically extending bore 32 and an axially extending bore 34.

A concentric tubular shaft 36 is fitted over the shaft 28 and is locked thereto by means of a pin 33 extending through the diametric bore 32 and through corresponding openings 40 and 42 in the shaft 36. The pin 33 may be locked therein by means of a pin 46 extending in the axial bore 34 through a corresponding bore in the pin 33. Furthermore, a retaining plug 48 may be provided at the end with the tubular shaft 36 and be held there by means of a retaining ring 50.

The other end of the sleeve-like shaft 36 is provided with a diaphragm disc 44 extending adjacent and parallel to the diaphragm disc 26. The diaphragm disc 44 is provided with an outer peripheral rim 52 which in turn is provided with a series of bores 54 through which fasteners in the form of nuts and bolts 56 pass through and fix the diaphragm disc 44 to a radial flange 58 of the shaft 60. The shaft 60, as shown in the drawings, is tubular and is mounted within the duplex bearings 62. The shaft 60 has splines 64 adapted to receive a splined shaft 66. The splined shaft 66 represents an input shaft of an accessory which is being driven by the turbine engine. The accessory, of course, is not shown herein.

A sleeve-shaped cap 68 is riveted to the shaft 60 at 70. The cap 68 enables the shafts 36 and 28 to maintain their axial alignment and alternate means to retain the pin 33 if the locking pin 46 is not utilized.

The rim 24 on diaphragm disc 26 is provided with teeth 74. Flange 58 mounts teeth 76 which mesh in a spaced-apart manner with teeth 74.

The tubular shafts 28 and 36 are made of suitably elastically deformable material, such as relatively thin, high quality, stainless steel. The torque magnitude is measured by a an electromagnetic pickup device 72 which is adapted to detect the difference in distance between respective teeth 74 and 76. The shafts 28 and 36 are, of course, cantilevered and provide a compact device with an effective length which is twice as long as the linear dimension provided by the unit. Accordingly, the torsion will be absorbed by the total length of the shafts 28 and 36 and be reflected by displacement of the teeth 76 relative to the reference teeth 74 which are mounted on the output shaft.

The effective torque length of this device can be extended by a multiplicity of concentric tubes arranged in a manner closely similar to the device described herein. The foregoing description is, therefore, intended to cover such derivatives.

We claim:

1. A torque measuring device adapted to be connected to an output shaft of an engine, the torque measuring device comprising at least first and second shaft members, the first shaft member adapted to be coupled at one end thereof to the output shaft of the engine, the second shaft member being tubular and concentric with the first shaft member, with one end of the second shaft member fixedly connected to the other end of the first shaft member, the other end of the second shaft member being adjacent said one end of the first shaft member, and a third shaft member coupled at one end thereof to the other end of the second shaft member, and the third shaft member being tubular and concentric with the first and second shaft members and being adapted to be coupled with an input shaft of means to be driven; the first and second shaft members being elastically deformable in response to the magnitude of the torque being transmitted between the output shaft of the engine and the input shaft of the means to be driven, and detection means associated with the one end of the first shaft member and the other end of the second shaft member to measure the relative phase displacement thereof and thus the magnitude of torque.

2. A torque measuring device as defined in claim 1, comprising a peripheral rim provided with reference teeth extending from the rim, the rim being adapted to be fixedly mounted to the output shaft; the other end of the second shaft member being provided with a diaphragm radial disc with a rim and teeth associated therewith, said teeth on the second shaft being interposed between said reference teeth mounted to the output shaft, and said detection means being provided with an electromagnetic pick-up for measuring the relative displacement of the teeth on the second shaft member relative to the reference teeth for determining the magnitude of torque between the output shaft of the engine and the input shaft of the means to be driven.

3. A torque measuring device as defined in claim 2, wherein the first shaft member is a hollow tube closed at its other end, bore means being provided extending diametrically thereof and adapted to receive a pin which in turn passes through respective passages in a sleeve portion of the one end of the second shaft member such as to fixedly lock the second shaft member to the first shaft member.

4. A torque measuring device for measuring the torque of the output shaft of a gas turbine engine, the output shaft including an annular coupling ring having a diameter greater than the shaft; a first radial annular diaphragm disc having a rim fixed to the coupling ring of the output shaft, the internal diameter of the first radial annular diaphragm disc being fixedly connected to one end of a first tubular shaft member, a second tubular shaft member concentric with the first tubular shaft member, and the second tubular shaft member having one end fixedly connected to the other end of the first tubular shaft member; the other end of the second tubular shaft member being adjacent said one end of the first tubular shaft member and including a second radial annular diaphragm disc extending adjacent to and parallel to the first radial annular diaphragm disc, the second radial annular diaphragm disc including a peripheral rim, and a third tubular shaft member being coupled to the peripheral rim of the second radial disc; the first and second shaft members being elastically deformable in response to the magnitude of torque being transmitted between the output shaft of the engine and the third shaft when the third tubular shaft is coupled to an input shaft of means to be driven, and detection means associated with the peripheral rims of the first and second radial discs for detecting relative phase displacement thereof and thus the magnitude of torque.

* * * * *